United States Patent
Fainstein et al.

(10) Patent No.: US 6,476,575 B1
(45) Date of Patent: Nov. 5, 2002

(54) METHOD AND SYSTEM FOR ADAPTIVE CONTROL OF TURNING OPERATIONS

(75) Inventors: Boris Fainstein, Jerusalem; Mark Zuckekrman, Tel Aviv; Igor Rubashkin, Jersusalem; Eduard Takachnik, Jersalem, all of (IL)

(73) Assignee: Omat Ltd., Jerusalem (IL)

( * ) Notice: Subject to any disclaimer, the term of this patent is extended or adjusted under 35 U.S.C. 154(b) by 0 days.

(21) Appl. No.: 09/786,322

(22) PCT Filed: Sep. 2, 1999

(86) PCT No.: PCT/IL99/00477

§ 371 (c)(1),
(2), (4) Date: Jun. 11, 2001

(87) PCT Pub. No.: WO00/14612

PCT Pub. Date: Mar. 16, 2000

(30) Foreign Application Priority Data

Sep. 2, 1998 (IL) .................................................. 126033

(51) Int. Cl.$^7$ ............................................... G05B 19/18
(52) U.S. Cl. ..................... 318/569; 318/571; 318/637; 318/568.22; 409/80; 409/186; 409/188; 408/8; 408/9; 408/10; 408/13
(58) Field of Search ........................... 318/568.22, 569, 318/571, 632; 409/80, 186, 188; 408/8, 9, 10, 11, 12, 13

(56) References Cited

U.S. PATENT DOCUMENTS

| | | | |
|---|---|---|---|
| 3,728,595 A | * | 4/1973 | Adams ......................... 318/39 |
| 4,150,327 A | | 4/1979 | Camera et al. |
| 4,237,408 A | | 12/1980 | Frecka |
| 4,509,126 A | | 4/1985 | Olig et al. |
| 4,547,847 A | | 10/1985 | Olig et al. |
| 4,698,773 A | * | 10/1987 | Jeppsson ..................... 364/474 |
| 5,083,280 A | * | 1/1992 | Yamamoto et al. ...... 364/474.3 |
| 5,083,485 A | | 1/1992 | Link et al. |
| 5,315,789 A | * | 5/1994 | Takashi .................... 51/165.71 |
| 5,727,912 A | | 3/1998 | Rubashkin et al. |
| 6,202,002 B1 | * | 3/2001 | Fainstein et al. ........... 700/175 |

* cited by examiner

Primary Examiner—Robert E. Nappi
Assistant Examiner—Rina I. Duda
(74) Attorney, Agent, or Firm—Browdy and Neimark, PLLC

(57) ABSTRACT

An adaptive control system for adaptively controlling a turning operation performed at a work piece by a turning tool adjusts a controlled input operation parameter F to maintain an output operation parameter ΔM substantially at a predetermined value $ΔM_o$ to compensate variation of the output operation paramemeter ΔM caused by the variation of at least one operation condition B=B (t). The system comprises a sensor (8) of the output operation parameter ΔM for providing a signal $U_c$ proportional to a current value $ΔM_c$ and an adaptive controller (10) for determining a value $F_c$ to which the input operation parameter F should be adjusted, as a function of $kU_c$, where k is a signal transmission coefficient which comprises an invariant signal transmission coefficient component $k_o$ inversely proportional to $ΔM_o$. The adaptive controller includes an amplifier transforming the signal $U_c$ into $k_oU_c$, and an input parameter override unit controlled to adjust the controlled operation input parameter to $F_c$. The adaptive controller further comprises a correction processing means calculating $k_cU_c$, where $k_c$ is a varying signal transmission coefficient component whose current values depend on the variation of the operation condition B=B (t). The adaptive controller is capable of calculating $k=f(k_o, k_c)$.

17 Claims, 5 Drawing Sheets

METHOD AND SYSTEM FOR ADAPTIVE CONTROL OF TURNING OPERATIONS

FIELD OF THE INVENTION

This invention relates to adaptive control of cutting operations on CNC-operated machine tools in which a controlled input parameter characterizing the movement of a cutting tool relative to a workpiece, is continuously adjusted during a cutting operation in response to a measured output operation parameter defining the productivity of the operation. The present invention particularly concerns the adaptive control of turning operations performed on lathes, where the controlled input parameter is a feed rate of the cutting tool and the output parameter is a cutting torque, cutting force or consumed power of the lathe's spindle drive.

BACKGROUND OF THE INVENTION

In a CNC-operated lathe, a program instructs a feeding means on a feed rate with which a tuning tool should cut a workpiece and instructs the lathe's spindle drive on a speed with which a workpiece associated therewith should be rotated. The feed rate and the selected speed are controlled input parameters that are normally fixed by the program for each cutting operation based on pre-programmed cutting conditions such as depth of cut, diameter of the workpiece, material of the workpiece to be machined, type of the cutting tool, etc.

However, the efficiency of CNC programs is limited by their incapability to take into account unpredictable real-time changes of some of the cutting conditions, namely the changes of the depth of cut, non-uniformity of a workpiece material, tool wear, etc.

Optimization of cutting operations on CNC-operated lathes, as well as on most other machine tools, is usually associated with the adaptive control of the movement of a cutting tool relative to a workpiece and, particularly, with the adjustment of the cutting tool's feed rate as a function of a measured cutting torque developed by the machine tool, to compensate the change in cutting conditions.

FIG. 3 illustrates a known control system for adaptively controlling a turning operation, for use with a CNC-operated lathe having a feeding means and a spindle drive that are instructed by a CNC program to establish the movement of, respectively, a cutting tool and a workpiece attached to the spindle, with pre-programmed values of respective controlled input parameters $F_o$ that is a basic feed of the cutting tool and $S_o$ that is a basic rotational speed of the spindle (the cutting tool and the workpiece are not shown).

As seen in FIG. 3, the control system comprises a torque sensor for measuring a cutting torque $\Delta M$ developed by the spindle drive. Depending on an unpredictable variation of cutting conditions B, the cutting torque $\Delta M$ may have different current values $\Delta M_c$, in accordance with which the torque sensor generates current signals $U_c$ proportional to $\Delta M_c$. The control system also comprises a known adaptive controller including an amplifier with a signal transmission coefficient $k_o'$, transforming the signal $U_c$ into $k_o'U_c$ and subsequently determining a value $F_c/F_o = f(k_o'U_c)$ to which the feed rate $F_c$ should be adjusted, by a feed rate override unit, in order to compensate the variation of the cutting conditions B and to, thereby, maintain the cutting torque $\Delta M_c$ as close as possible to its maximal value $\Delta M_{max}$, required for the maximal metal-working productivity.

The maximal value of the cutting torque $\Delta M_{max}$ is a predetermined cutting torque developed by the spindle drive during cutting with a maximal depth of cut, and the signal transmission coefficient of the amplifier is defined as $$k_o' = \frac{1}{U_{max}},$$

where $U_{max}$ is a signal from the torque sensor corresponding to the maximal torque $\Delta M_{max}$.

The current value $F_c/F_o$ is defined by the adaptive controller based on its signal transmission coefficient $k_o'$, pre-programmed basic feed rate $F_o$ and signal $U_c$, in accordance with the following relationship:

$$\frac{F_c}{F_o} = A - k_o' U_c, \tag{1}$$

where $A = F_{id}/F_o$, and $F_{id}$ is an idle feed (feed without cutting).

The coefficient A characterizes the extent to which the feed rate $F_c$ may be increased relative to its pre-programmed value $F_o$, and it usually does not exceed 2.

Since, as mentioned above, the signal $U_c$ is proportional to the cutting torque $\Delta M_c$, the relationship (1) may be presented, for the purpose of explaining the physical model of the adaptive controller, as follows:

$$\frac{F_c}{F_o} = A - K_o' \Delta M_c = a_c, \tag{2}$$

where $K_o'$ is a correction coefficient corresponding to the signal transmission coefficient $k_o'$ of the adaptive controller and it is accordingly calculated as $$K_o' = \frac{1}{\Delta M_{max}}.$$

The physical model of the adaptive controller is illustrated in FIG. 4. As seen, the change of the cutting conditions B influences the current value $\Delta M_c$ of the cutting torque which is used by the adaptive controller to determine the coefficient $a_c$ characterizing the current value $F_c$ to which the feed rate should be adjusted to compensate the changed cutting conditions B.

It is known that, in a turning operation, the cutting condition that changes unpredictably in time and that is mostly responsible for the variation of the cutting torque is the depth of cut $h_c = h_c(t)$. When turning a workpiece of a given diameter, the cutting torque $\Delta M_c$ is proportional to the depth of cut $h_c$ as follows:

$$\Delta M_c = cF_c h_c = cF_o a_c h_c, \tag{3}$$

where c is a static coefficient established for turning operations and $a_c$ is defined in the equation (2).

Based on the equations (3) and (2), the cutting torque $\Delta M_c$ may be expressed as:

$$\Delta M_c = \frac{AcF_o h_c}{1 + cF_o h_c K_o'} \tag{4}$$

If in the equation (4), the coefficient A=2 and $h_c = h_{max}$, the maximal cutting torque $\Delta M_c$ may be expressed as:

$$\Delta M_{max} = \frac{2cF_o h_{max}}{1 + cF_o h_{max} K'_o} \quad (5)$$

Similarly, when the depth of cut is of a very small value $h_{min}$ such that $h_{min}/h_{max} \ll 1$, the cutting torque $\Delta M_{min}$ will also be very small:

$$\Delta M_{min} \approx 2cF_o h_{min} \ll \Delta M_{max} \quad (6)$$

It follows from the above that, with Me adaptive controller as described, there still may be a significant variation of the cutting torque $\Delta M_c$ during cutting with the depth of cut varying in a wide range, as illustrated in FIG. 5, curve I.

It is the object of the present invention to provide a new method and system for the adaptive control of a turning operation.

SUMMARY OF THE INVENTION

In accordance with one aspect of the present invention there is provided a method of adaptively controlling a turning operation performed on a workpiece by a turning tool, by controlling an adjustable input operation parameter F of the movement of the turning tool relative to the workpiece, to maintain an output operation parameter $\Delta M$ substantially at a predetermined value $\Delta M_o$ and thereby to substantially compensate the variation of said output operation parameter $\Delta M$ caused by the variation of at least one operation condition $B=B(t)$ varying in time, the method comprising the steps of:

(a) measuring a current value $\Delta M_c$ of the output parameter $\Delta M$, (b) estimating the relation between $\Delta M_c$ and $\Delta M_o$ by multiplying $\Delta M_c$ by a correction coefficient K which comprises an invariant correction coefficient component $K_o$ inversely proportional to $\Delta M_o$, and (c) determining a value $F_c$ to which the input operation parameter F should be adjusted, as a function of $K\Delta M_c$; characterized in that (d) said correction coefficient K comprises a varying correction coefficient component whose current value $K_c$ changes in accordance with the variation of said operation condition $B=B(t)$, the step (b) further comprising calculating the current value $K_c$ and calculating $K=f(K_o, K_c)$.

Preferably, $K=K_o-K_c$.

The operation input parameter F is preferably a feed rate of the turning tool and the operation output parameter $\Delta M$ is preferably a cutting torque developed by a drive rotating the workpiece. However, the operation output parameter may also be a cutting force applied by the tool to the workpiece or a power consumed by the drive.

The predetermined value $\Delta M_o$ of the output parameter is preferably a maximal value $\Delta M_{max}$ which this parameter may have when the varying operation condition B differs to a maximal extent from its original or nominal value.

In accordance with preferred embodiments of the present invention, the invariant correction coefficient component $K_o$ is defined as $$K_o = \frac{A}{\Delta M_{max}},$$

where $$A = \frac{F_{id}}{F_o},$$

with $F_{id}$ being an idle feed and $F_o$ being a pre-programmed basic feed rate.

The varying operation condition B may be a real physical parameter such as a depth of cut $h_c=h_c(t)$, hardness of the workpiece material, etc., whereby current values of the varying coefficient component $K_c$ may then be obtained based on sensing current values of this parameter. Alternatively, the varying operation condition B may be a mathematical equivalent of one or more physical parameters of the cutting process.

In accordance with another aspect of the present invention, there is provided an adaptive control system for adaptively controlling a turning operation performed at a workpiece by a turning tool, by adjusting a controlled input operation parameter F to maintain an output operation parameter $\Delta M$ substantially at a predetermined value $\Delta M_o$ and thereby to substantially compensate variation of said output operation parameter $\Delta M$ caused by the variation of at least one operation condition $B=B(t)$, the system comprising:

a sensor of the output operation parameter $\Delta M$ for providing a signal $U_c$ proportional to a current value $\Delta M_c$;

an adaptive controller for determining a value $F_c$ to which the input operation parameter F should be adjusted, as a function of $kU_c$, where k is a signal transmission coefficient which comprises an invariant signal transmission coefficient component $k_o$ inversely proportional to $\Delta M_o$, said controller including an amplifier capable of transforming the signal $U_c$ into $kU_c$; and an input parameter override unit capable of being controlled by said adaptive controller to adjust the controlled operation input parameter to $F_c$;

characterized in that said controller further comprises a correction processing means for calculating $k_c Uc_c$, where $k_c$ is a varying signal transmission coefficient component whose current values depend on the variation of said operation condition $B=B(t)$, the controller being capable of calculating $k=f(k_o, K_c)$.

Preferably, the adaptive controller is capable of calculating $k=k_o-k_c$, and calculating $k_o$ as $$k_o = \frac{A}{U_o},$$

where $U_o$ is a signal from the sensor of the operation output parameter corresponding to the value $\Delta M_o$. Preferably, $\Delta M_o = \Delta M_{max}$ and $U_o = U_{max}$.

Preferably, the sensor of the output operation parameter $\Delta M$ is a sensor of a cutting torque developed by a drive rotating the workpiece and the input parameter override unit is a feed rate override unit.

The correction processing means may comprise a sensor or a calculator for, respectively, sensing or calculating current values of the operation condition B, to be subsequently used in the calculation of $k_c$.

BRIEF DESCRIPTION OF THE DRAWINGS

In order to understand the invention and to see how it may be carried out in practice, preferred embodiments will now be described, by way of non-limiting examples only, with reference to the accompanying drawings, in which.

DETAILED DESCRIPTION OF PREFERRED EMBODIMENTS

Figure 1A:
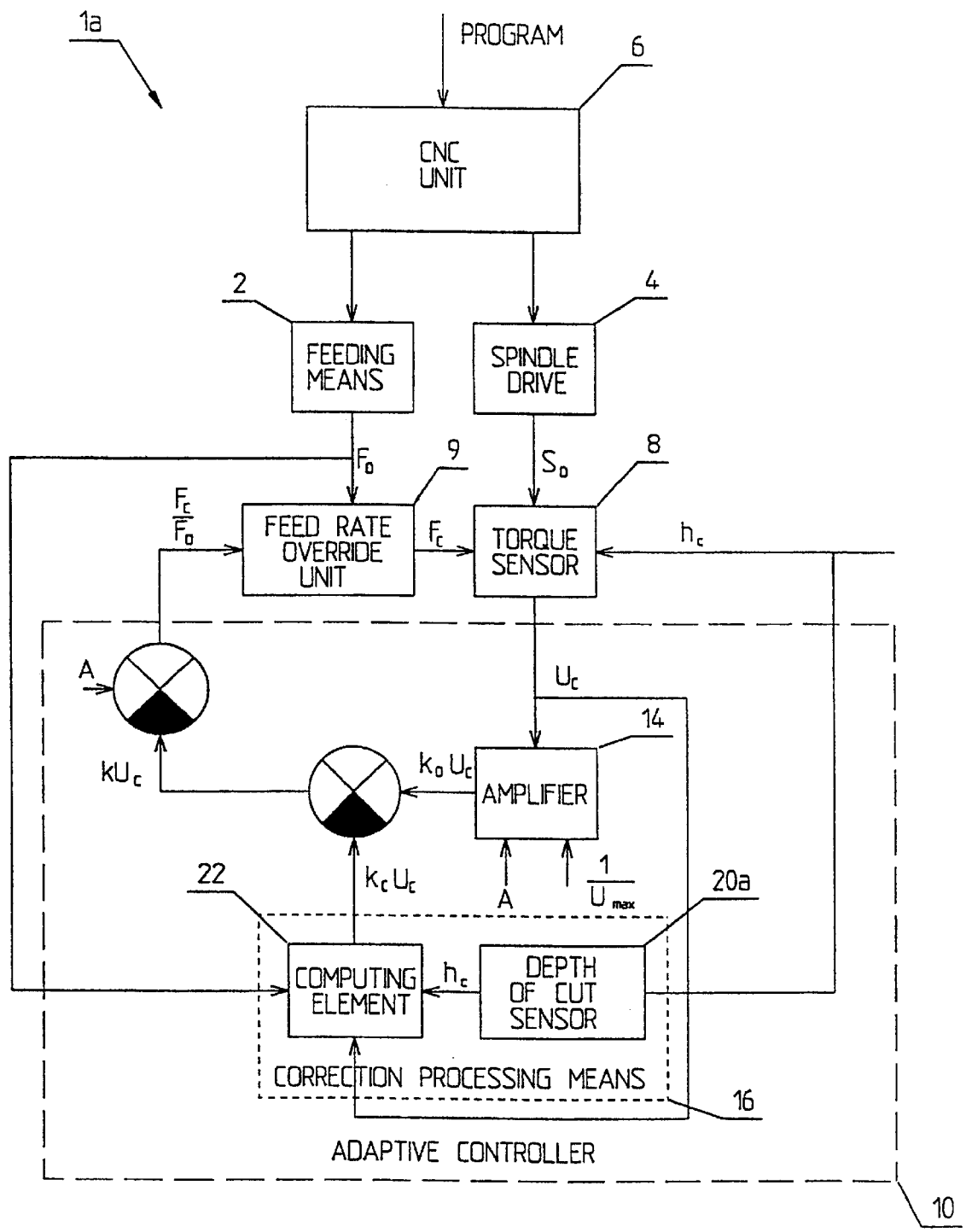
FIGS. 1A and 1B are block diagrams of adaptive control systems having adaptive controllers in accordance with two different embodiments of the present invention.
Figure 1B:
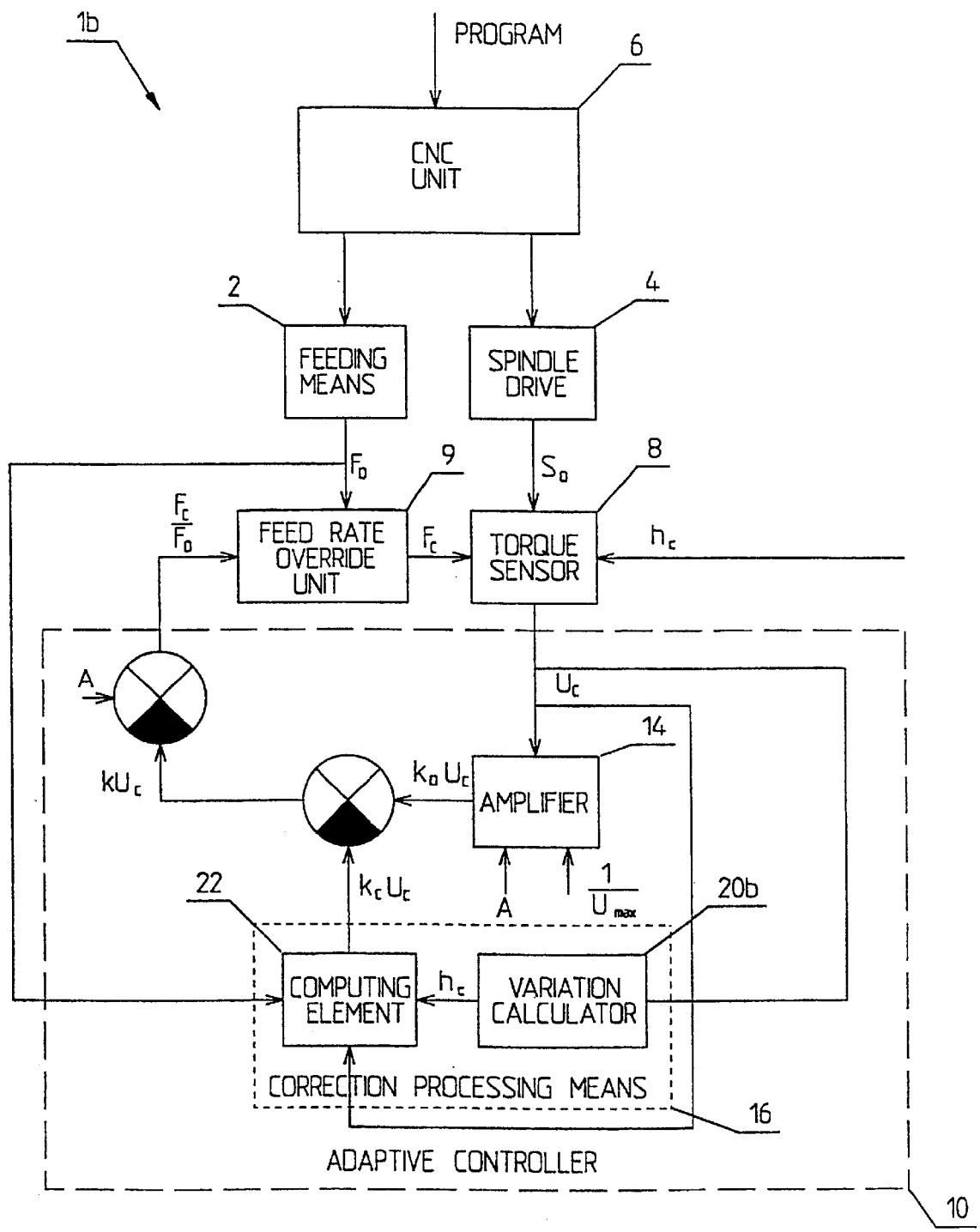

FIGS. 1A and 1B illustrate two different embodiments of an adaptive control system according to the present invention, for use with a CNC-operated lathe for adaptively controlling a turning operation performed on a workpiece by a cutting tool (not shown).

The control systems designated as 1a and 1b in respective FIGS. 1A and 1B, each have a feeding means 2 connected to the cutting tool and a spindle drive 4 associated with the workpiece, that are instructed by a program of a CNC unit 6 to establish the relative movement between the cutting tool and the workpiece with pre-programmed values of respective basic feed rate $F_o$ of the cutting tool and basic rotational speed $S_o$ of the spindle.

Each control system, 1a and 1b further comprises a torque sensor 8 for measuring a cutting torque $\Delta M_c$ developed by the spindle drive and varying in time depending on a cutting depth $h_c=h_c(t)$ and generating a signal $U_c$ proportional to the cutting torque $\Delta M_c$. It also has a feed rate override unit 9 for adjusting the feed rate $F_c$ so as to maintain the cutting torque $\Delta M_c$ as close as possible to its maximal value $\Delta M_{max}$, required for the maximal metal-working productivity. The feed rate override unit 9 is controlled by an adaptive controller 10 operating on the signal $U_c$ from the torque sensor 8 to determine the extent $F_c/F_o$ to which the override unit 9 should adjust the feed rate $F_c$.

In accordance with the equation (1) presented in the Background of the Invention, the known adaptive controller of turning operations described therein determines $F_c/F_o$ as:

$$\frac{F_c}{F_o} = A - k'_o U_c,$$

where $k_o'$ is a signal transmission coefficient of the known adaptive controller.

It will now be explained how in the adaptive controller 10 of the present invention, the signal transmission coefficient k, or its physical equivalent—the correction coefficient K—is calculated in a manner that takes into account the variation of the depth of cut $h_c$.

As explained in the Background of the Invention, the cutting torque $\Delta M_c$ in turning operations may be expressed in accordance with the equation (4), in which, for the purpose of the present explanation, A is a coefficient characterizing the extent to which the feed rate $F_c$ may be increased relative to the pre-programmed value $F_o$.

It follows from the equation (4) that, for ensuring the condition $\Delta M_c = \Delta M_{max}$, the correction coefficient K should be:

$$K = \frac{A}{\Delta M_{max}} - \frac{1}{cF_o h_c}, \quad (7)$$

where in accordance with the present invention, $A/\Delta M_{max} = AK_o'$ constitutes a first correction coefficient component $K_o$ which is invariant in time and $1/cF_o h_c$ constitutes a second correction coefficient component $K_c$ which varies in accordance with the variation of the depth of cut $h_c$.

Based on the equation (3)

$$\frac{1}{cF_o h_c} = \frac{a_c}{\Delta M_c},$$

wherefrom the correction coefficient K may also be expressed as:

$$K = \frac{A}{\Delta M_{max}} - \frac{a_c}{\Delta M_c}. \quad (8)$$

It follows from the above that the second coefficient component $K_c$ may be expressed either as $1/cF_o h_c$ or as $a_c/\Delta M_c$.

The determination of the correction coefficient K should be performed under the logical conditions that K should not be less than a zero and should not exceed $1/\Delta M_{max}$.

Figure 2A:
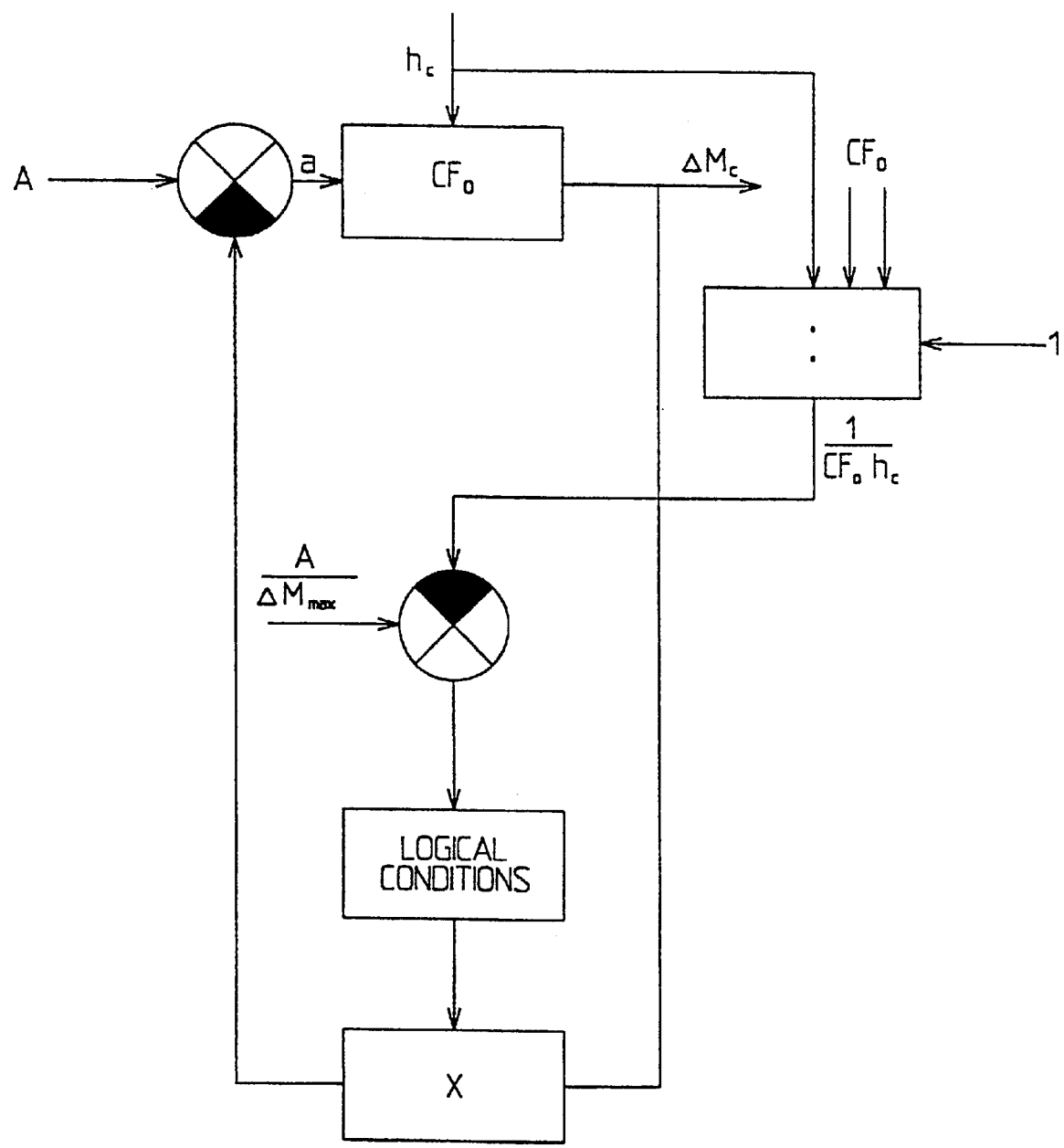
FIGS. 2A and 2B illustrate physical models of the adaptive controllers shown, respectively, in FIGS. 1A and 1B.
Figure 2B:
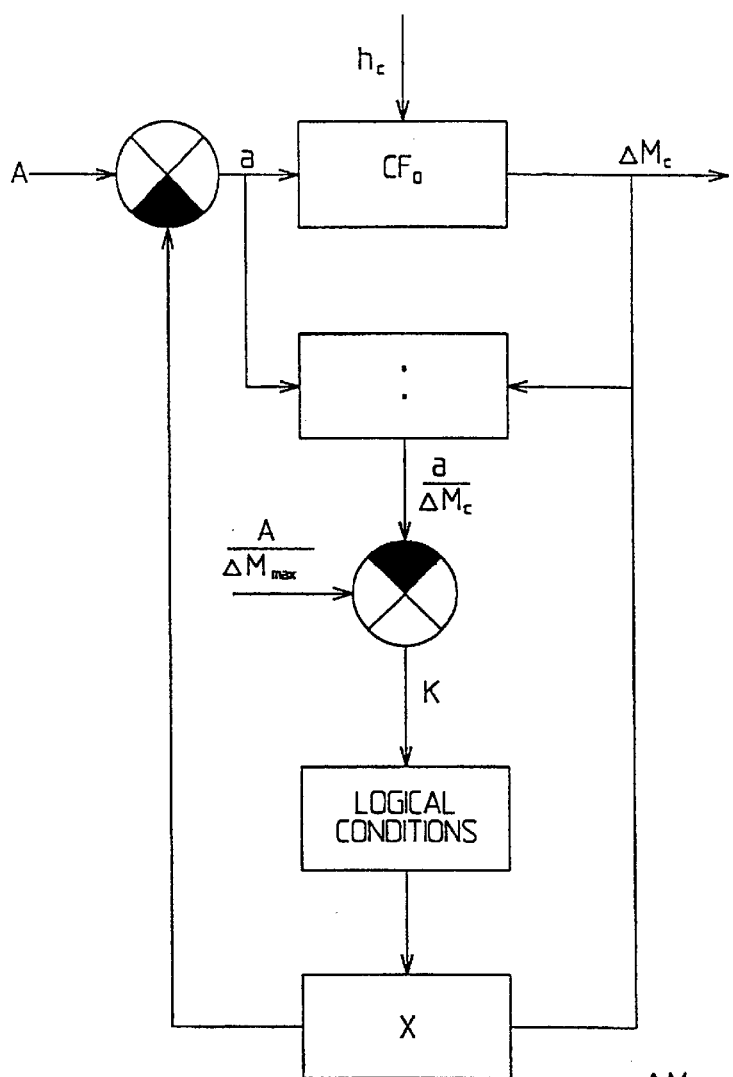

FIGS. 2a and 2b represent physical models of the determination of the coefficient K, based on the above equations (7) and (8).

In the control systems 1a and 1b of the present invention, the physical models presented in FIGS. 2A and 2B are implemented by the adaptive controller 10 constructed to determine $kU_c = k_o U_c - k_c U_c$, where $k_o$ is a predetermined invariant sign transmission coefficient component and $k_c$ is a varying signal transmission coefficient component dependent on the depth of cut $h_c$.

The coefficient components $K_o$ and $K_c$ are determined in the same manner as the correction coefficients $K_o$ and $K_c$. Namely, the invariant coefficient component $k_o$ is determined as $$k_o = \frac{A}{U_{max}},$$

where $U_{max}$ is a signal from the torque sensor 8 corresponding to the maximal torque $\Delta M_{max}$. The varying coefficient component $k_c$ is determined either as $$k_c = \frac{1}{cF_o h_c}, \quad (9)$$

or, based on the equation (3), as $$k_c = \frac{a_c}{U_c}. \quad (10)$$

To determine $kU_c$, the adaptive controller 10 comprises an amplifier 14 with the invariant signal transmission coefficient $k_o$ and a correction processing means 16 with the varying signal transmission coefficient $k_c$. Depending on the manner in which the varying signal transmission coefficient component $k_c$ is determined (according to either the equation 9 or the equation 10), the correction processing means 16 may have either a depth of cut sensor 20a (FIG. 1a) or a variation calculator of cutting conditions 20b (FIG. 1b), and a computing element 22 for determining current values of $k_c U_c$ respectively based on either equation (9) or equation (10) in accordance with the respective physical models in FIGS. 2A and 2B.

Figure 5:
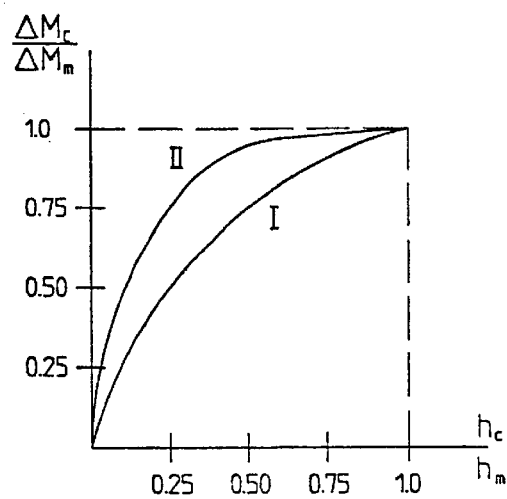
FIG. 5 illustrates the dependence of the cutting torque $\Delta M_c$ on the cutting depth $h_c$ in systems having a known adaptive controller as shown in FIGS. 3 and 4 (curve I), and having an adaptive controller according to the present invention (curve II).
Figure 3:
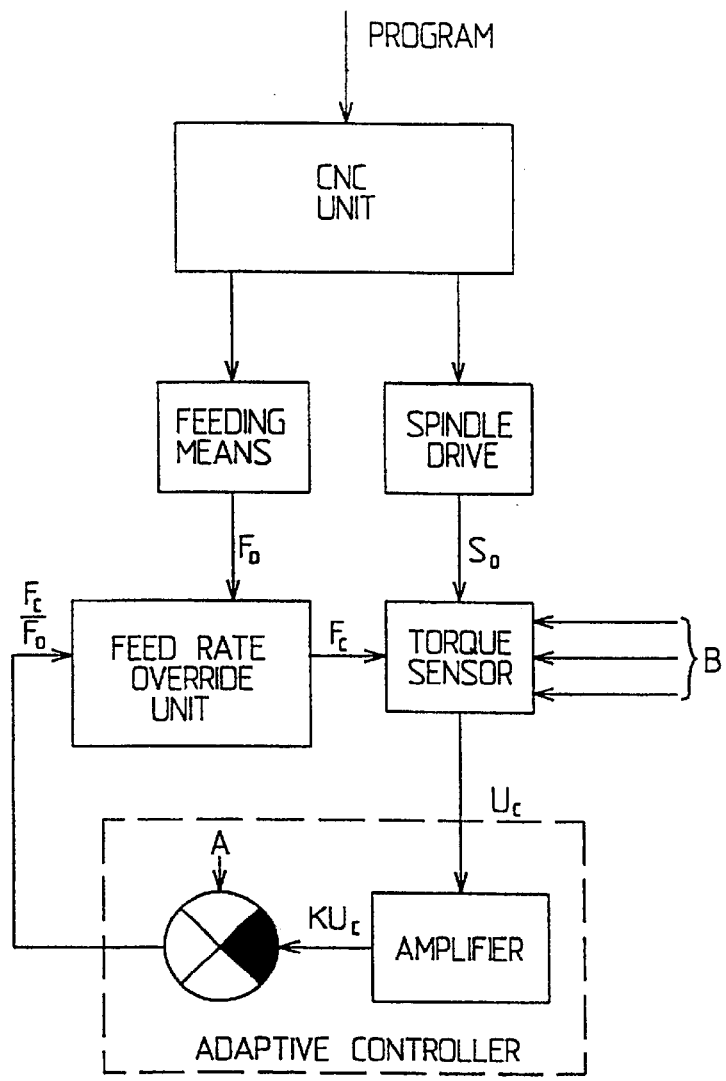
FIG. 3 is a block diagram of a control system having a known adaptive controller.
Figure 4:
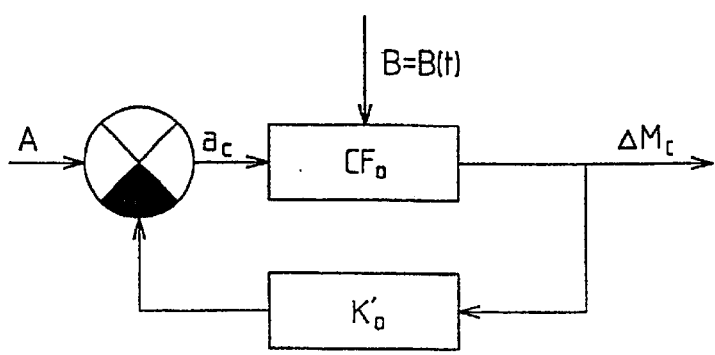
FIG. 4 illustrates a physical model of the known adaptive controller shown in FIG. 3.

By virtue of the adaptive control provided by the control system of the present invention, the feed rate of turning tools may be adjusted, taking into account the variation of the depth of cut $h_c$, so as to maintain the cutting torque $\Delta M_c$ as close as possible to its maximal value $\Delta M_{max}$, in a substantially wide range of the depth of cut, whereby the productivity of the metal-working is increased. This is illustrated in FIG. 5 as well as in the following table showing experimental results obtained with a known adaptive control system and with an adaptive control system according to the present invention:

|  |  | $h_c/h_{max}$: | 1 | 0.9 | 0.8 | 0.7 | 0.6 | 0.5 | 0.4 | 0.3 | 0.2 | 0.1 | 0 |
|---|---|---|---|---|---|---|---|---|---|---|---|---|---|
| Known adaptive Control system (I) | $a_I$ | | 1.0 | 1.0 | 1.1 | 1.1 | 1.2 | 1.3 | 1.4 | 1.5 | 1.6 | 1.8 | 2.0 |
| | $\frac{\Delta M_I}{\Delta M_{max}}$ | | 1.0 | 0.90 | 0.80 | 0.72 | 0.70 | 0.62 | 0.50 | 0.43 | 0.30 | 0.20 | 0 |
| Adaptive control system of the present invention (II) | $a_{II}$ | | 1.0 | 1.1 | 1.3 | 1.6 | 1.9 | 2.0 | 2.0 | 2.0 | 2.0 | 2.0 | 2.0 |
| | $\frac{\Delta M_{II}}{\Delta M_{max}}$ | | 1.0 | 0.98 | 0.98 | 0.98 | 0.98 | 0.90 | 0.82 | 0.70 | 0.43 | 0.25 | 0 |
| Comparative Productivity | $(a_{II}/a_I-1) \times 100\%$ | | 0 | 10 | 18 | 41 | 58 | 54 | 43 | 33 | 25 | 11 | 0 |

The above-described embodiments of the adaptive control system according to the present invention present non-limiting examples thereof, and it should be clear to a skilled person that, within the scope of the claims, this system may have features different from those described, and shown in the drawings.

What is claimed is:

1. A method of adaptively controlling a turning operation performed on a workpiece by a turning tool, by controlling an adjustable input operation parameter F of the movement of the turning tool relative to the workpiece, to maintain an output operation parameter $\Delta M$ substantially at a predetermined value $\Delta M_o$ and thereby to substantially compensate the variation of said output operation parameter $\Delta M$ caused by the variation of at least one operation condition $B=B(t)$ varying in time, the method comprising the steps of:

(a) measuring a current value $\Delta M_c$ of the output parameter $\Delta M$, (b) estimating the relation between $\Delta M_c$ and $\Delta M_o$ by multiplying $\Delta M_c$ by a correction coefficient K which comprises an invariant correction coefficient component $K_o$ inversely proportional to $\Delta M_o$, and (c) determining a value $F_c$ to which the input operation parameter F should be adjusted, as a function of $K\Delta M_c$; characterized in that (d) said correction coefficient K comprises a varying correction coefficient component whose current value $K_c$ changes in accordance with the variation of said operation condition $B=B(t)$, the step (b) further comprising calculating the current value $K_c$ and calculating $K=f(K_o,K_c)$.

2. A method according to claim 1, wherein $K=K_o-K_c$.

3. A method according to claim 1, wherein the operation input parameter F is a feed rate of the turning tool.

4. A method according to claim 1, wherein the operation output parameter $\Delta M$ is a cutting torque developed by a drive rotating the workpiece.

5. A method according to claim 1, wherein the predetermined value $\Delta M_o$ of the output parameter is a maximal value $\Delta M_{max}$ which this parameter may have when the varying operation condition B differs to a maximal extent from its original or nominal value.

6. A method according to claim 5, wherein the invariant correction coefficient component $K_o$ is defined as $$K_o = \frac{A}{\Delta M_{max}},$$

where $$A = \frac{F_{id}}{F_o},$$

with $F_{id}$ being an idle feed and $F_o$ being a pre-programmed basic feed rate.

7. A method according to claim 1, wherein the varying operation condition B is a real physical parameter.

8. A method according to claim 7, wherein said parameter is the depth of cut $h_c=h_c(t)$.

9. A method according to claim 7, wherein current values of the varying coefficient component $K_c$ are obtained based on sensing current values of said parameter.

10. A method according to claim 1, wherein the varying operation condition B is a mathematical equivalent of one or more physical parameters of the cutting process.

11. An adaptive control system for adaptively controlling a turning operation performed at a workpiece by a turning tool, by adjusting a controlled input operation parameter F to maintain an output operation parameter $\Delta M$ substantially at a predetermined value $\Delta M_o$ and thereby to substantially compensate variation of said output operation parameter $\Delta M$ caused by the variation of at least one operation condition $B=B(t)$, the system comprising:

a sensor of the output operation parameter $\Delta M$ for providing a signal $U_c$ proportional to a current value $\Delta M_c$;

an adaptive controller for determining a value $F_c$ to which the input operation parameter F should be adjusted, as a function of $kU_c$, where k is a signal transmission coefficient which comprises an invariant signal transmission coefficient component $k_o$ inversely proportional to $\Delta M_o$, said controller including an amplifier capable of transforming the signal $U_c$ into $k_o U_c$; and an input parameter override unit capable of being controlled by said adaptive controller to adjust the controlled operation input parameter to $F_c$;

characterized in that said controller further comprises a correction processing means for calculating $k_c U_c$, where $k_c$ is a varying signal transmission coefficient component whose current values depend on the variation of said operation condition $B=B(t)$, the controller being capable of calculating $k=f(k_o,k_c)$.

12. An adaptive controller according to claim 11, further capable of calculating $k=k_o-k_c$, and calculating $k_o$ as $$k_o = \frac{A}{U_o},$$

where $U_o$ is a signal from the sensor of the operation output parameter corresponding to the value $\Delta M_o$.

13. An adaptive controller according to claim 12, wherein $\Delta M_o = \Delta M_{max}$ and $U_o = U_{max}$.

14. An adaptive controller according to claim 11, wherein said sensor of the output operation parameter $\Delta M$ is a sensor of a cutting torque developed by a drive rotating the workpiece.

15. An adaptive controller according to claim 11, wherein said input parameter override unit is a feed rate override unit.

16. An adaptive controller according to claim 11, wherein said correction processing means comprises a sensor or for sensing current values of the operation condition B, to be subsequently used in the calculation of $k_c$.

17. An adaptive controller according to claim 11, wherein said correction processing means comprises a calculator for calculating current values of the operation condition B, to be subsequently used in the calculation of $k_c$.

* * * * *